(12) United States Patent
Hong et al.

(10) Patent No.: US 10,365,422 B2
(45) Date of Patent: Jul. 30, 2019

(54) LUMINOUS MOUSE PAD AND LUMINOUS BASE BODY THEREOF

(71) Applicant: HADES-GAMING CORP., New Taipei (TW)

(72) Inventors: Ching-Tsun Hong, New Taipei (TW); Hung-Jen Chou, New Taipei (TW)

(73) Assignee: HADES-GAMING CORP., New Taipei (TW)

( * ) Notice: Subject to any disclaimer, the term of this patent is extended or adjusted under 35 U.S.C. 154(b) by 0 days.

(21) Appl. No.: 16/016,711

(22) Filed: Jun. 25, 2018

(65) Prior Publication Data

US 2019/0113669 A1 Apr. 18, 2019

(30) Foreign Application Priority Data

Oct. 18, 2017 (TW) .............................. 106215318 U

(51) Int. Cl.
  *F21V 8/00* (2006.01)
  *F21V 33/00* (2006.01)
  *G06F 3/039* (2013.01)

(52) U.S. Cl.
  CPC .......... *G02B 6/001* (2013.01); *F21V 33/0048* (2013.01); *G06F 3/0395* (2013.01)

(58) Field of Classification Search
  CPC ....... G06F 3/0395; G06F 3/039; G02B 6/001; G02B 6/3628; G02B 6/3636; G09F 13/18; G09F 2013/1836; F21V 33/0048

USPC ................................................. 362/565, 253
See application file for complete search history.

(56) References Cited

U.S. PATENT DOCUMENTS

| | | | | |
|---|---|---|---|---|
| 6,530,670 B2 * | 3/2003 | Hirayama | ............ | G02B 6/0021 349/65 |
| 6,635,336 B1 * | 10/2003 | Chen | ..................... | G06F 3/0395 248/346.01 |
| 7,175,310 B1 * | 2/2007 | Cotterell | ............... | G06F 3/0395 362/253 |
| 2013/0058129 A1* | 3/2013 | Limber | .................. | G06F 1/3231 362/605 |
| 2016/0124526 A1* | 5/2016 | Chou | .................... | G06F 3/0395 362/311.02 |

* cited by examiner

*Primary Examiner* — William N Harris
(74) *Attorney, Agent, or Firm* — Li & Cai Intellectual Property (USA) Office

(57) ABSTRACT

A luminous mouse pad includes a base plate, a light source, and a light-guiding pipe. The light source is disposed in the fixing unit. The light-guiding pipe is fixed on a periphery of the base plate. At least one end of the light-guiding pipe is adjacent to the light source and guides a light from the light source into the light-guiding pipe. The light-guiding pipe is exposed outside the periphery of the base plate, so that the light from the light source irradiates from a surface of the light-guiding pipe.

12 Claims, 7 Drawing Sheets

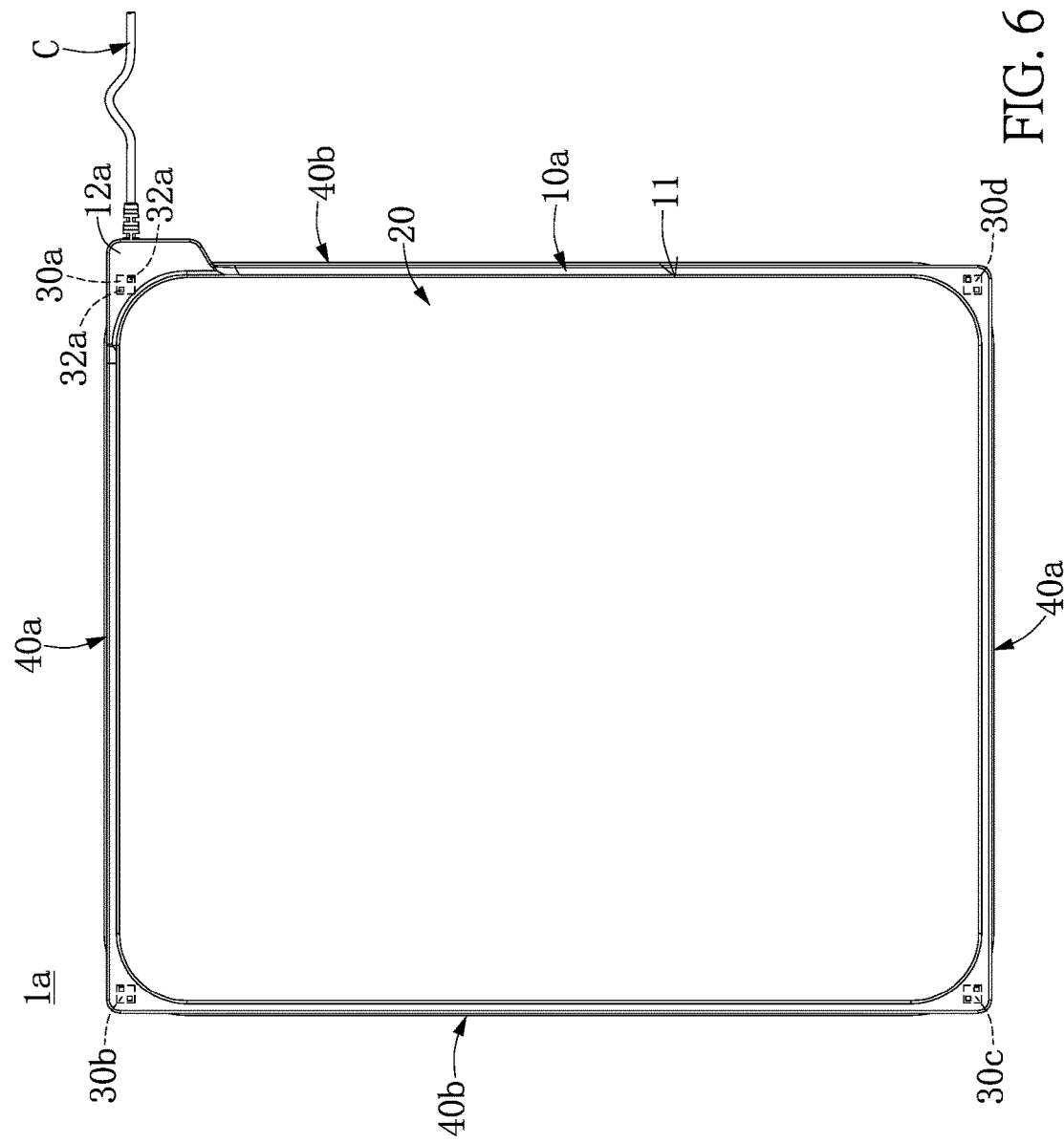

LUMINOUS MOUSE PAD AND LUMINOUS BASE BODY THEREOF

BACKGROUND OF THE DISCLOSURE

Field of the Disclosure

The present disclosure is related to a luminous mouse pad and a luminous base body thereof. In particular, the present disclosure relates to a luminous mouse pad which is capable of providing illuminating effects, or a luminous base body of the mouse pad having a mat replaceable by a user according to requirements.

Description of Related Art

One conventional way to provide a computer mouse pad with luminous effect is using Light-emitting Diode (LED) combined with a light-guiding board, or other light sources. However, the decorative effect of such is still limited, and the total cost is high. Further, after the mouse pad is used for a long time, the top mat thereof is easy to get dirty and cannot be replaced. As a result, the entire computer mouse pad is needed to be replaced totally and most elements are not recyclable, which does not meet the environmental friendly trend.

SUMMARY OF THE DISCLOSURE

One of the objectives of the present disclosure is to provide a luminous mouse pad, which can provide a periphery of the mouse pad with a luminous effect.

In order to achieve the above objectives, according to one exemplary embodiment of the present disclosure, a luminous mouse pad includes a base plate, a light source, and a light-guiding pipe. The base plate has a fixing unit on a periphery thereof. The base plate has a sliding layer disposed on a top surface thereof. The light source is disposed in the fixing unit. The light-guiding pipe is fixed at the periphery of the base plate. The light-guiding pipe has at least one end close to the light source and guiding light from the light source into the light-guiding pipe. The light-guiding pipe is exposed outside the periphery of the base plate, so that the light from the light source is shined from the surface of the light-guiding pipe.

According to an embodiment of the present disclosure, the luminous mouse pad further includes a mat, the base plate is formed with an accommodating portion on a top surface thereof in a concave manner, the mat is disposed in the accommodating portion, the sliding layer is formed on a top surface of the mat.

According to an embodiment of the present disclosure, the base plate is a hard mat, and the base plate is formed with an embedding slot at a periphery thereof. The embedding slot extends into the fixing unit, and the light-guiding pipe is embedded fixedly in the embedding slot of the base plate.

According to an embodiment of the present disclosure, the base plate is a soft mat, and the base plate has at least one stitching thread fixed on the periphery of the base plate. The at least one stitching thread is defined with a receiving space for retaining the light-guiding pipe.

According to an embodiment of the present disclosure, the fixing unit includes a first retaining portion and a second retaining portion, and the light source is fixedly clamped between the first retaining portion and the second retaining portion. The first retaining portion is formed with a first embedding half-slot, and the second retaining portion is formed with a second embedding half-slot.

According to an embodiment of the present disclosure, the mat has a shape corresponding to a shape of the accommodating portion.

According to an embodiment of the present disclosure, the light source has a circuit board, and at least one point light source.

According to a preferable embodiment of the present disclosure, the luminous mouse pad further includes a lower mat which is attached to a bottom surface of the base plate.

According to an embodiment of the present disclosure, the fixing unit is formed at a corner of the base plate.

Another of the objectives of the present disclosure is to provide a luminous base body of mouse pad, which is capable of receiving a mat for a computer mouse sliding, and the mat is replaceable by a user, and it can provide the mat with a peripheral luminous effect.

In order to achieve the above objectives, according to one exemplary embodiment of the present disclosure, a luminous base body of mouse pad, which is capable of receiving a mat for computer mouse sliding. The luminous base body includes a base plate, a light source, and a light-guiding pipe. The base plate has a fixing unit on a periphery thereof. The light source is disposed in the fixing unit. The light-guiding pipe is fixed on the periphery of the base plate. The light-guiding pipe has at least one end adjacent to the light source to guide light from the light source into the light-guiding pipe.

According to an embodiment of the present disclosure, the periphery of the base plate is formed with an embedding slot, and the embedding slot extends into the fixing unit. The light-guiding pipe is fixedly embedded in the embedding slot of the base plate.

Thus, the present disclosure has advantages as follows. The luminous mouse pad according to the present disclosure provides the light-guiding pipe which has a portion exposed to the periphery of the base plate and the light from the light source can irradiates forth from the surface of the light-guiding pipe, to provide a luminous effect around the whole periphery of the mat. The luminous base body of the mouse pad of the present disclosure can be replaced or being matched with a different mat according to requirements.

For further understanding of the present disclosure, reference is made to the following detailed description illustrating the embodiments and examples of the present disclosure. The description is for illustrative purpose only and is not intended to limit the scope of the claim.

BRIEF DESCRIPTION OF THE DRAWINGS

FIG. 6 is a top view of the luminous mouse pad according to a second embodiment of the present disclosure.

DETAILED DESCRIPTION OF THE EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

First Embodiment

Figure 1:
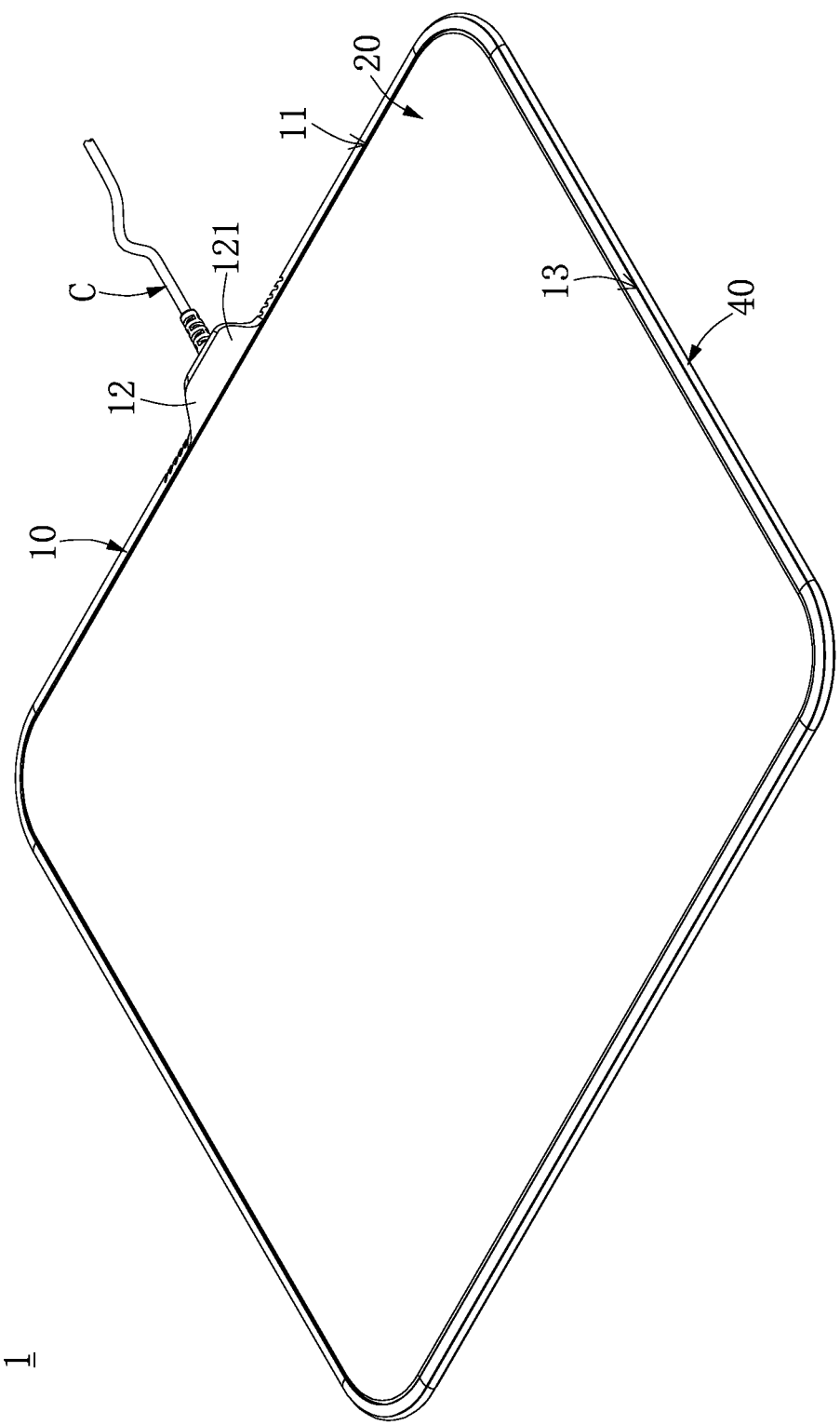
FIG. 1 is a perspective view of a luminous mouse pad of the present disclosure.
Figure 2:
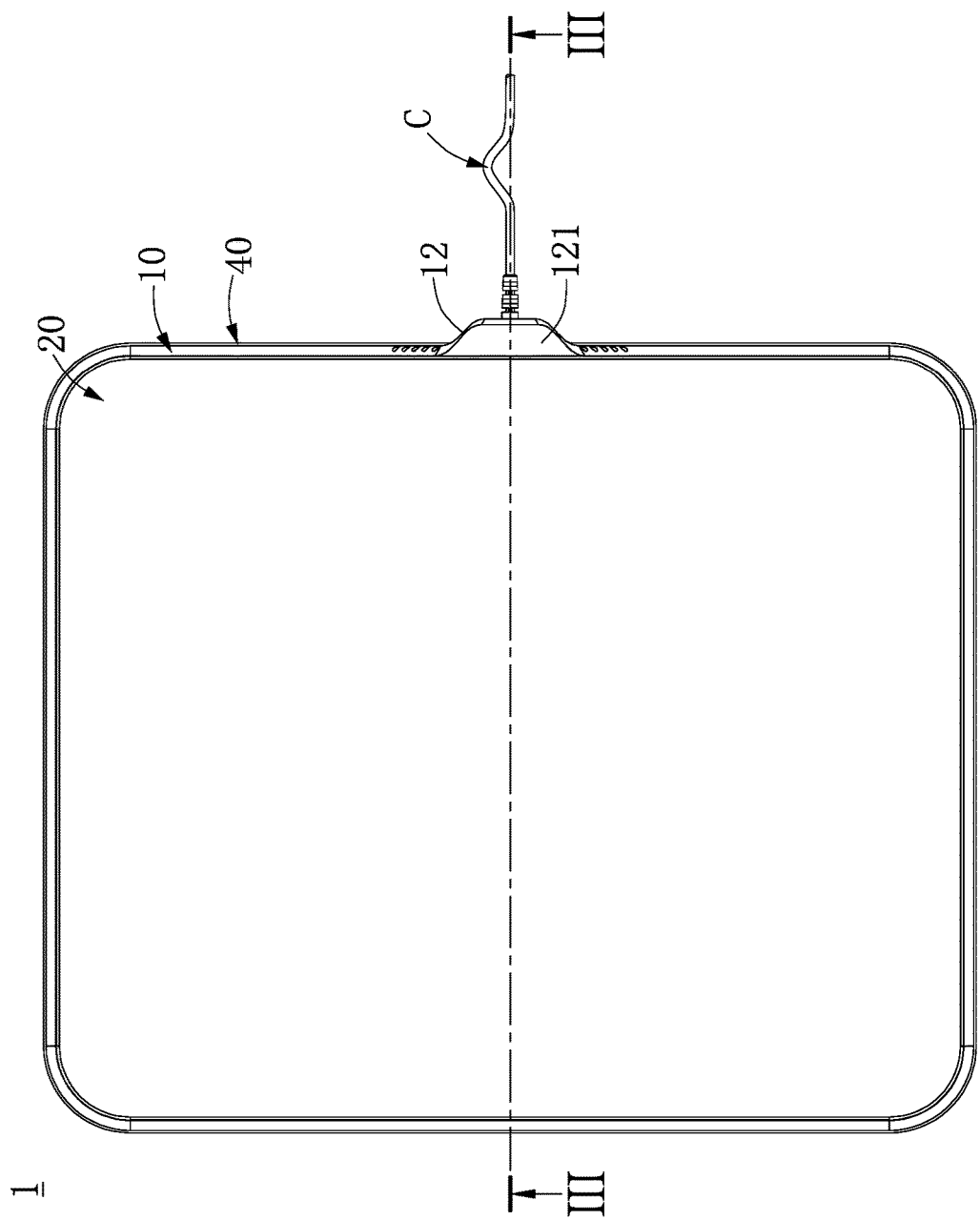
FIG. 2 is a top view of the luminous mouse pad of the present disclosure.
Figure 3:
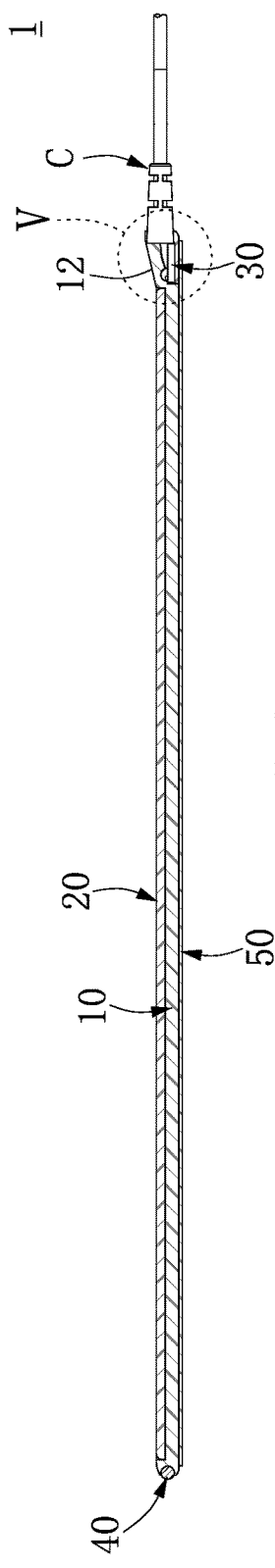
FIG. 3 is a cross-sectional view of the luminous mouse pad of the present disclosure.

Reference is made to FIG. 1 to FIG. 3, which include perspective view and top view of a luminous mouse pad of the present disclosure. The present disclosure provides a luminous mouse pad 1, which includes a base plate 10, a mat 20, a light source 30, a light-guiding pipe 40, and a lower mat 50.

The base plate 10 has a top surface which is concavely formed with an accommodating portion 11, so as to receive the mat 20. The periphery of the base plate 10 is formed with an embedding slot 13, and the embedding slot 13 encircles most of the periphery of the base plate 10 to receive the light-guiding pipe 40. A fixing unit 12 is disposed on the periphery of the base plate 10, and the embedding slot 13 is extended into the fixing unit 12. The fixing unit 12 is used to fix the light source 30 and a cable C.

The periphery of the base plate 10 in this embodiment can be lateral sides of the base plate 10, which is substantially of a C-shape. However, the present disclosure is not limited thereto. For example, the embedding slot can be formed upward on the top surface of the base plate 10 adjacent to the lateral side of the top surface. However, the contour of the embedding slot is not limited thereto, which can be a straight line, curve, or special shape with a molding . . . etc. The base plate 10 can be rectangular, but is not limited thereto. For example, it can be a circle, or be of another special shape.

The mat 20 is disposed in the accommodating portion 11 of the base plate 10. In this embodiment, the shaped of the mat 20 is corresponding to the shape of the accommodating portion 11. The top surface of the mat 20 is formed with a sliding layer, so that a computer mouse can slide on the sliding layer. The material of the mat 20 can be polyester film (such as Mylar), cloth, or metallic . . . etc. However, the present disclosure is not limited thereto. The mat 20 can be separated from the base plate 10, so that user can dispose one different mat 20 on the base plate 10. In other words, after the mat 20 is moved, the present disclosure provides a luminous base body of mouse pad, so that user can replace one different mat 20 by themselves according to requirements.

An extended description of the base plate 10 is provided as follows. The material preferably is a hard pad, so that the embedding slot 13 can be easily formed. For example, it can be made of hard plastic or metallic board. In addition, the top surface of the base plate 10 can be directly formed with a sliding layer, so that computer mouse can move on the top surface of the base plate 10. In such embodiment, the base plate can omit the accommodating portion 11 and the mat 20.

Figure 4:
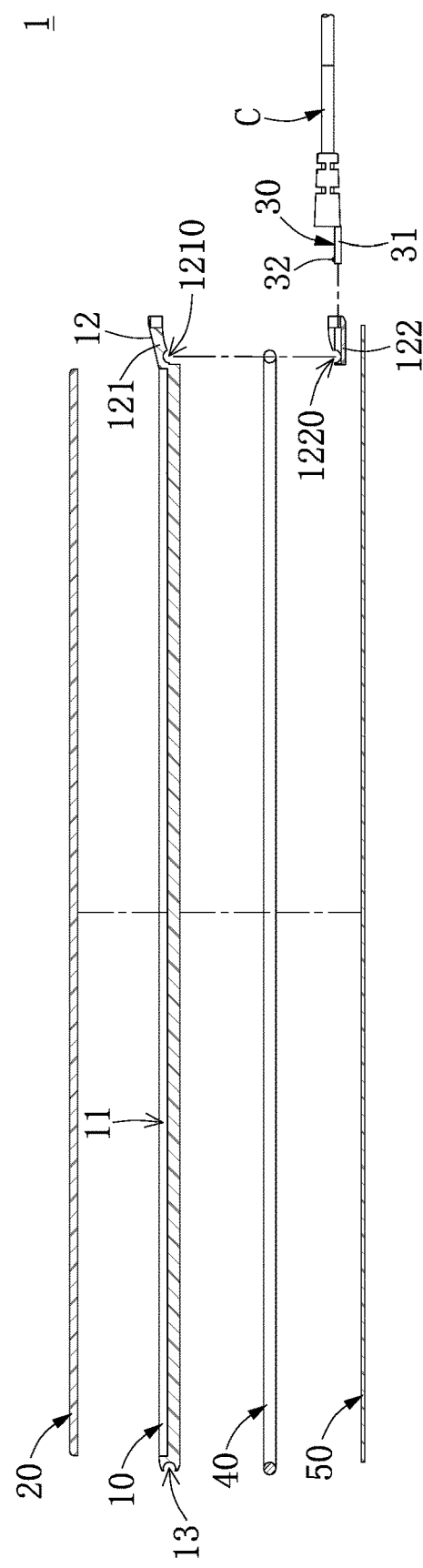
FIG. 4 is a cross-sectional exploded view of the luminous mouse pad of the present disclosure.
Figure 5:
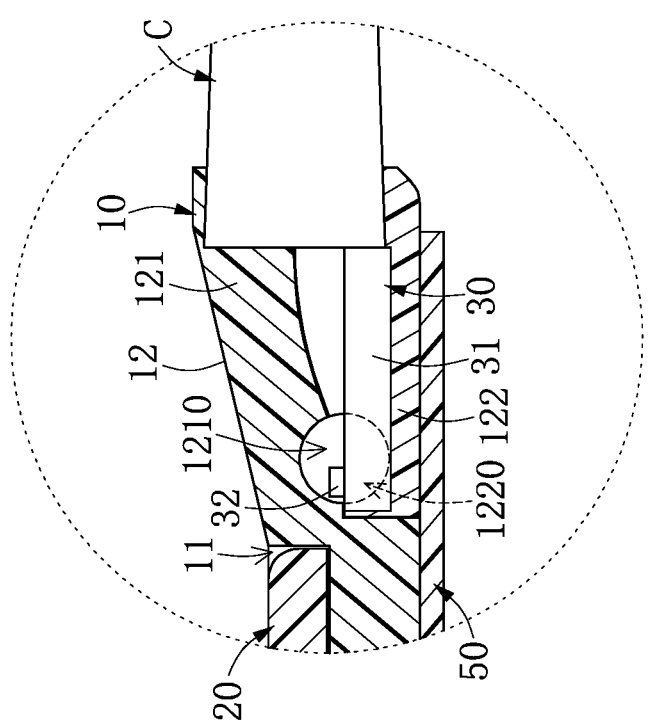
FIG. 5 is a partially enlarged view of the luminous mouse pad in FIG. 3 of the present disclosure.

Reference is made to FIG. 3 to FIG. 5, which include cross-sectional view, exploded cross-sectional view, and partial enlarged cross-sectional view of the luminous mouse pad. The light source 30 is disposed on the fixing unit 12 of the base plate 10. The light source 30 has a circuit board 31, and at least one point light source 32, such as LED. According to one embodiment of this present disclosure, the light source 30 has two point light sources 32, which are corresponding to two ends of the light-guiding pipe 40.

In this embodiment, the fixing unit 12 has a first retaining portion 121 and a second retaining portion 122. The light source 30 is fixedly clamped between the first retaining portion 121 and second retaining portion 122. The first retaining portion 121 and the second retaining portion 122 can be fixed together by screws. In another way, the first retaining portion 121 and the second retaining portion 122 can be combined together by plastic injection. For example, the light source 30 and the cable C are put in a mold, and by inserted molding technology, the first retaining portion 121 and the second retaining portion 122 are injected to embed the light source 30 and the cable C. However, the structure of the fixing unit is not limited to the above embodiment. The way to fix the light source 30 and the light-guiding pipe 40 could be different.

Figure 5A:
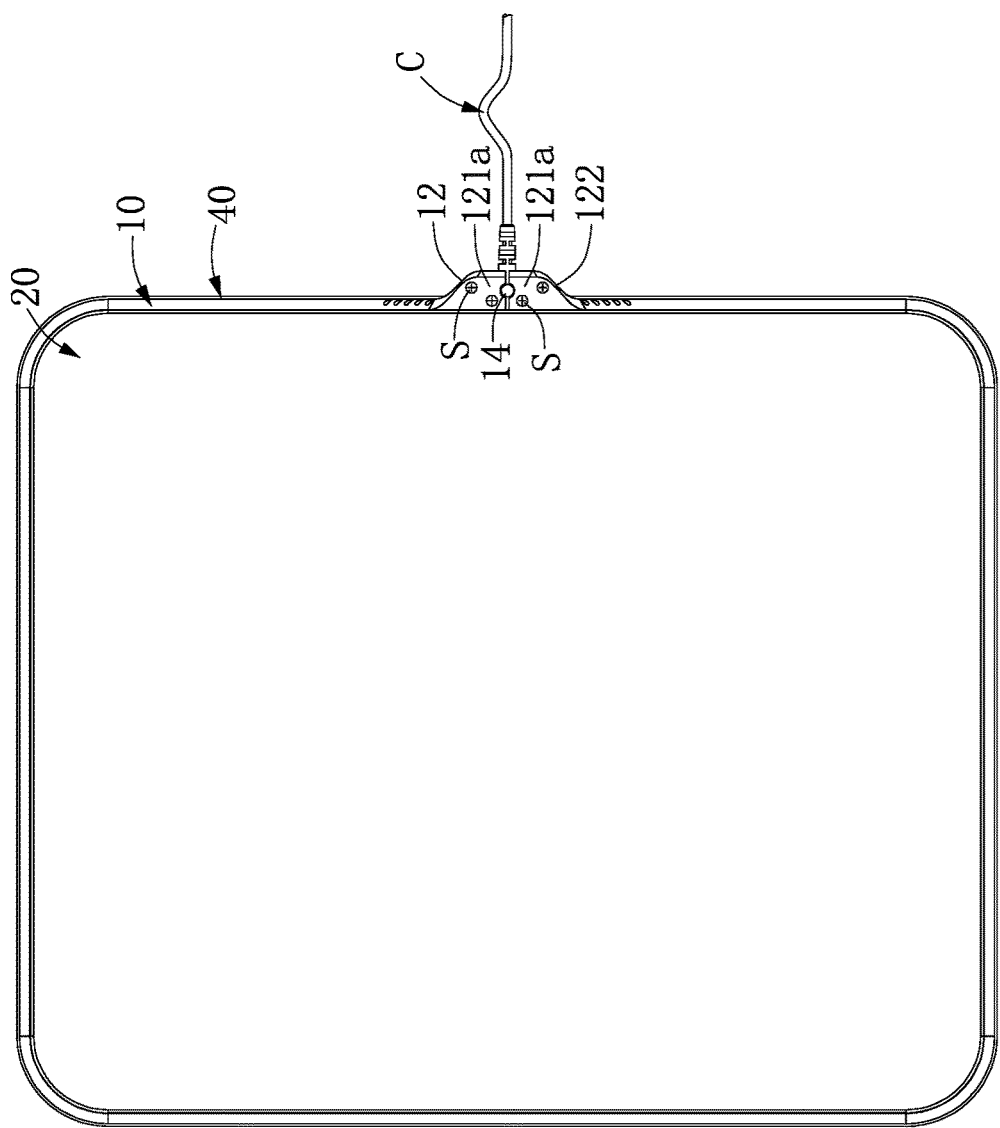
FIG. 5A is a top view of the luminous mouse pad with another fixing unit of the present disclosure.

Reference is made to FIG. 5 and FIG. 5A. The element on the fixing unit 12 can be divided into two first retaining portion 121a, which can be fixed by screws S. In addition, a switch button 14 is provided to control the light source 30 to turn on/off. It is supplementarily noted that the light source 30 can be not fixed to the base plate 10, and can be separated from the base plate 10. The light source 30 and the light-guiding pipe 40 can be connected by other light guiding element, for example, connecting the light source 30 with the light-guiding pipe 40.

The light-guiding pipe 40 is embedded and fixed in the embedding slot 13 of the base plate 10. In this embodiment, the light-guiding pipe 40 can be optical fiber pipe, or of light-guiding material, such as acrylic, or polycarbonate (PC). However, the present disclosure is not limited thereto. Rather, any structure or device guiding the light from the light source 30 to travel out of the light source 30 and to irradiate at the periphery of the light-guiding pipe 40 would suffice the definition of the light-guiding pipe 40 of the present disclosure. The cross-sectional shape of the light-guiding pipe 40 is not limited to circle. Rather, the light-guiding pipe 40 can be shaped like a rectangular rod or a thin piece. The light-guiding pipe 40 has at least one end adjacent to the light source 30 for guiding the light from the light source 30 into the light-guiding pipe 40. A part of the light-guiding pipe 40 is exposed outside the embedding slot 13. If necessary, the outer surface of the light-guiding pipe 40 can be formed with micro-translucent structures, such as matte surface, to increase diffuse reflection.

The advantages of this embodiment are as follows. The light-guiding pipe 40 has parts which are exposed outside the periphery of the base plate 10, so that the light from the light source 30 is able to irradiate through the surface of the light-guiding pipe 40 and further irradiate around the periphery of the mat 20. Accordingly, a circle-shaped luminous effect is produced at the periphery of the mat 20. The base plate 10 can be made of transparent or opaque material, and preferably that not affecting or interfering with the light produced by the computer mouse.

Reference is made to FIG. 4. The first retaining portion 121 is formed with a first embedding half-slot 1210, and the second retaining portion 122 is formed with a second embedding half-slot 1220. In other words, the embedding slot 13 extends from the periphery of the base plate 10 into the fixing unit 12. Thus, two ends of the light-guiding pipe 40 extend to be adjacent to the light source 30 in the fixing unit 12, so that the light can be guided into ends of the light-guiding pipe 40.

In this embodiment, the luminous mouse pad 1 further includes a lower mat 50, which is attached to the bottom surface of the base plate 10. The lower mat 50 can be one piece or composed of many pieces, which can provide skid-proofing function. However, the lower mat 50 can be omitted. For example, the bottom surface of the base plate 10 can be formed with a plurality of skid-proofing protrusions . . . etc.

Reference is made to FIG. 1 and FIG. 2. The fixing unit 12 in this embodiment is disposed at a middle position of one lateral side of the base plate 10. The number of the light-guiding pipe 40 is one, and the length is slightly shorter than the total length of the circumference of the base plate 10. Two ends of the light-guiding pipe 40 are fixed in the fixing unit 12, and are adjacent to the point light source 32.

Second Embodiment

Reference is made to FIG. 6, which is a top view of the luminous mouse pad of second embodiment. In this embodiment, the difference between the luminous mouse pad 1a and the above embodiment is that, the fixing unit 12a is arranged at a corner of the base plate 10a. There are four light sources, and the four light sources 30a, 30b, 30c, 30d are disposed at four corners of the base plate 10a. Around the periphery of the base plate 10a, there are two light-guiding pipes 40a and two light-guiding pipes 40b. Two sides of each of the four light sources 30a, 30b, 30c, 30d are connected to two of the four light-guiding pipes 40a and 40b. The light sources 30a, 30b, 30c, 30d respectively have two point light sources. For example, the light source 30a has two point light sources 32a, one is adjacent to one end of the light-guiding pipe 40a located at an upper edge of the base plate 10a in FIG. 6, and one is adjacent to one end of the light-guiding pipe 40b adjacent to a right edge of the base plate 10a in FIG. 6.

The advantages of this embodiment are that, the light sources 30a, 30b, 30c, 30d respectively have two point light sources, which can shine toward eight directions, therefore a mixed-color luminous effect can be achieved, providing more visual enjoyment for a user.

However, the present disclosure is not limited thereto. For example, the number of the light source can be two, and are disposed at two opposite corners of the base plate 10a, such as the upper right corner and lower left corner as shown in FIG. 6. Two light-guiding pipes, which are substantially L-shaped, are disposed at the periphery of the base plate 10a, and each is connected to two sides of two light sources.

The above embodiments are illustrated with the rectangular base plate 10a and the two light sources on corners of the base plate 10a. However, this embodiment can be applied to another base plate with a different shape, such as circular-shaped or square-shaped base plate. Further, it can be equipped with more than two light sources on different positions of the periphery of the base plate.

Third Embodiment

Figure 7:
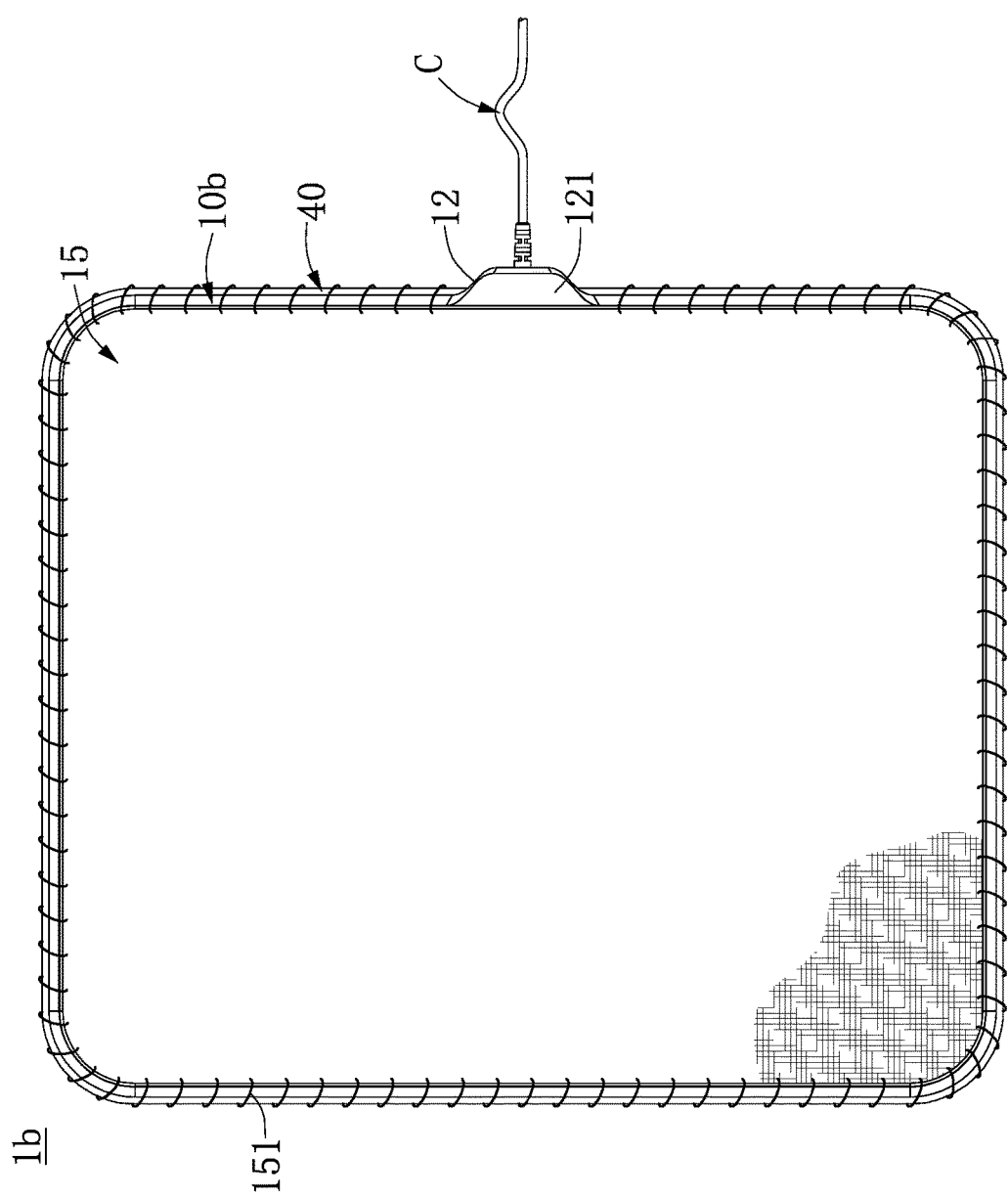
FIG. 7 is a top view of the luminous mouse pad according to a third embodiment of the present disclosure.

Reference is made to FIG. 7. According to the present disclosure, the luminous mouse pad 1b could have a mesh fabric layer 15 on the base plate 10b. The top surface of the base plate 10b in this embodiment can be flat, omitting the accommodating portion and the mat. The mesh fabric layer 15 is disposed on the top surface of the base plate 10b.

Differing to the above embodiments, the base plate 10b can be a flexible mat for conveniently folding and carrying. The light-guiding pipe 40 can be fixed to the base plate 10b by the stitching of stitching threads 151. In this embodiment, the stitching threads 151 surround the light-guiding pipe 40 to form a receiving space, and the embedding slot of the base plate 10b can be omitted.

The stitching manner for fixing the light-guiding pipe 40 is not limited to the surrounding manner as shown in FIG. 7. It can use the available serger sewing machine, or overlock sewing machine, to perform cover-stitching and fix the light-guiding pipe 40 to the periphery of the mesh fabric layer 15. Cover-stitching is a kind of stitching where two or three stitching threads appear on a front surface, and a looper stitching thread appears on the rear surface, so as to form a receiving space to retain the light-guiding pipe 40.

It is supplementarily noted that, the light-guiding pipe 40 can be received in a strip-shaped receiving bag, and the receiving bag is fixedly stitched on base plate 10b by the stitching threads 151.

To sum up, the present disclosure has advantages as follows. The present disclosure provides the luminous mouse pad, and a portion of the light-guiding pipe 40 is exposed to the periphery of the base plate (10, 10a, 10b), so that the light from the light source 30 irradiates through the light-guiding pipe 40, to provide a luminous effect around the whole periphery of the mat 20. In addition, by providing a plurality of light sources, which can shine in different directions, a plurality of mixed-color luminous effects can be achieved.

The descriptions illustrated supra set forth simply the exemplary embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A luminous mouse pad, comprising:
a base plate, having a fixing unit on a periphery thereof, and a sliding layer disposed on a top surface thereof;
a light source, disposed in the fixing unit; and
a light-guiding pipe, fixed at the periphery of the base plate; the light-guiding pipe having at least one end adjacent to the light source and guiding light from the light source into the light-guiding pipe; the light-guiding pipe being exposed outside the periphery of the base plate, thereby the light from the light source irradiates from a surface of the light-guiding pipe.

2. The luminous mouse pad as claimed in claim 1, further comprising a mat, wherein the top surface of the base plate is formed concavely with an accommodating portion, and the mat is disposed in the accommodating portion; and
wherein the sliding layer is formed on a top surface of the mat.

3. The luminous mouse pad as claimed in claim 1, wherein the periphery of the base plate is formed with an embedding slot, and the embedding slot extends into the fixing unit;
wherein the light-guiding pipe is fixedly embedded in the embedding slot of the base plate.

4. The luminous mouse pad as claimed in claim 1, wherein the base plate has at least one stitching thread fixed on the periphery of the base plate, the at least one stitching threads defines a receiving space for retaining the light-guiding pipe.

5. The luminous mouse pad as claimed in claim 1, wherein the fixing unit has a first retaining portion and a second retaining portion, and the light source is fixedly clamped between the first retaining portion and the second retaining portion; wherein the first retaining portion is formed with a first embedding half-slot, and the second retaining portion is formed with a second embedding half-slot.

6. The luminous mouse pad as claimed in claim 2, wherein the mat has a shape corresponding to a shape of the accommodating portion.

7. The luminous mouse pad as claimed in claim 1, wherein the light source has a circuit board, and at least one point light source.

8. The luminous mouse pad as claimed in claim 1, further comprising a lower mat attached to a bottom surface of the base plate.

9. The luminous mouse pad as claimed in claim 1, wherein the fixing unit is disposed on a corner of the base plate.

10. The luminous mouse pad as claimed in claim 9, wherein a number of the light source is more than two, and the light sources are disposed on two or more positions of the periphery of the base plate, wherein the periphery of the base plate has two or more of the light-guiding pipes, and the light-guiding pipes are connected to the light sources.

11. A luminous base body of a mouse pad, being capable of receiving a mat for a computer mouse sliding, comprising:
- a base plate, having a fixing unit on a periphery thereof;
- a light source, disposed in the fixing unit; and
- a light-guiding pipe, fixed on the periphery of the base plate; wherein the light-guiding pipe has at least one end adjacent to the light source to guide light from the light source into the light-guiding pipe.

12. The luminous base body of a mouse pad as claimed in claim 11, wherein the periphery of the base plate is formed with an embedding slot, and the embedding slot extends into the fixing unit; wherein the light-guiding pipe is fixedly embedded in the embedding slot of the base plate.

\* \* \* \* \*